United States Patent [19]

Pryor

[11] 4,420,253

[45] Dec. 13, 1983

[54] METHOD AND APPARATUS FOR DETECTING WEAR OR BREAKAGE OF TOOLS AND OTHER OBJECTS

[75] Inventor: Timothy R. Pryor, Tecumseh, Canada

[73] Assignee: Diffracto Ltd., Windsor, Canada

[21] Appl. No.: 323,397

[22] Filed: Nov. 20, 1981

[51] Int. Cl.³ .................. G01N 21/00; G02B 5/14; B23B 39/00
[52] U.S. Cl. .................................. 356/237; 250/227; 408/11; 408/16; 409/134
[58] Field of Search .................... 356/237, 240, 73.1; 407/120; 408/11, 16, 711; 409/148, 187, 134, 194, 254; 250/227

[56] References Cited

U.S. PATENT DOCUMENTS 3,579,775  5/1971  Carlson ........................... 407/120 X
4,184,145  1/1980  Fima .............................. 250/227 X Primary Examiner—Vincent P. McGraw
Assistant Examiner—L. A. Dietert
Attorney, Agent, or Firm—Larson and Taylor

[57] ABSTRACT

To determine whether an object, such as a tool, is worn or broken, there is embedded in the object an elongate fiber optic. One end of the fiber optic is at a surface of the object and such that a second, light emitting end of said fiber optic is located within the body of said object and spaced a distance from a further surface of the object, such that a portion of the object overlies the other end. When the object is broken or worn to such an extent that the other end of the fiber optic is exposed, light directed at the first mentioned end of the fiber optic will be detectable at the other end. Thus, by directing light onto the one end, and by detecting any light emitted at the second end, a worn or broken object is readily detected. The invention has particular use in the automatic inspection of tools in automated manufacturing.

14 Claims, 3 Drawing Figures

4,420,253

METHOD AND APPARATUS FOR DETECTING WEAR OR BREAKAGE OF TOOLS AND OTHER OBJECTS

FIELD OF THE INVENTION

The present invention relates to methods and apparatus for detecting wear or breakage of objects such as tools, and to objects provided with internal means for automatically detecting wear or breakage.

With the advent of automated manufacturing, particularly using robots, a problem of tool wear or breakage arises. While a human operator can readily see that a drill bit, for example, has broken, it is difficult and expensive to provide a robot with "vision" that will enable the robot to detect tool breakage. In some installations, the cost of providing such vision will be prohibitively expensive, thus necessitating human tool inspection. In other instances, such as the detection of tool wear, the difficulty and expense is substantially increased. It is, therefore, desirable to provide an inexpensive and reliable method and apparatus for detecting the wear and breakage of objects such as tools, particularly machine tools.

It is, therefore, an object of the invention to provide a reliable and inexpensive method of detecting the wear and breakage of objects such as tools, particularly machine tools. It is a further object to provide an object, such as a tool, with internal means for providing an indication of tool wear or breakage.

BRIEF SUMMARY OF THE INVENTION

The foregoing and other objects which will be apparent to those of ordinary skill in the art are achieved in accordance with the present invention by providing:

a method of detecting wear or breakage of an object which comprises: providing an object having an elongate fiber optic imbedded in the object such that a first, light receiving end of said fiber optic is located at a first surface of the object and such that a second, light emitting end of said fiber optic is covered by a portion of said object overlying said light emitting end of said fiber optic; directing light onto said light receiving end of said fiber optic whereby said light is transmitted along said fiber optic to the light emitting end thereof, said light being such that the portion of the object overlying said light emitting end of said fiber optic is opaque thereto; and, detecting any light emitted from said light emitting end of said fiber optic whereby the detection of emitted light provides an indication that the portion of said object overlying said light emitting end of said fiber optic is not present;

apparatus for detecting wear or breakage of an object which comprises: an object having an elongate fiber optic imbedded in the object such that a first, light receiving end of said fiber optic is located at a first surface of the object and such that a second, light emitting end of said fiber optic is located within the body of said object and spaced from a further surface of the object such that the light emitting end of said fiber optic is covered by a portion of said object overlying said light emitting end of said fiber optic; means for directing light onto said light receiving end of said fiber optic whereby said light is transmitted along said fiber optic to the light emitting end thereof, said light being such that the portion of the object overlying said light emitting end of said fiber optic is opaque thereto; and means for detecting any light emitted from said light emitting end of said fiber optic whereby the detection of emitted light provides an indication that the portion of said object overlying said light emitting end of said fiber optic is not present; and an object having an internal wear or breakage indicator comprising an elongate fiber optic imbedded in the object such that a first, light receiving end of said fiber optic is located at a first surface of the object and such that a second, light emitting end of said fiber optic is located within the body of said object and spaced from a further surface of the object such that the light emitting end of said fiber optic is covered by a portion of said object overlying said light emitting end of said fiber optic.

DETAILED DESCRIPTION OF PREFERRED EMBODIMENTS

There follows a detailed description of preferred embodiments of the invention.

Figure 1:
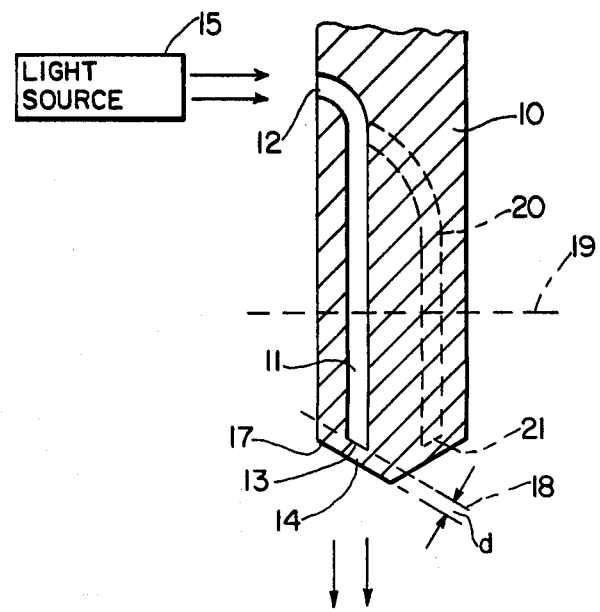
FIG. 1 is a diagrammatic side elevation view of a cutting tool member and a light guide associated therewith in accordance with my invention.
Figure 1:
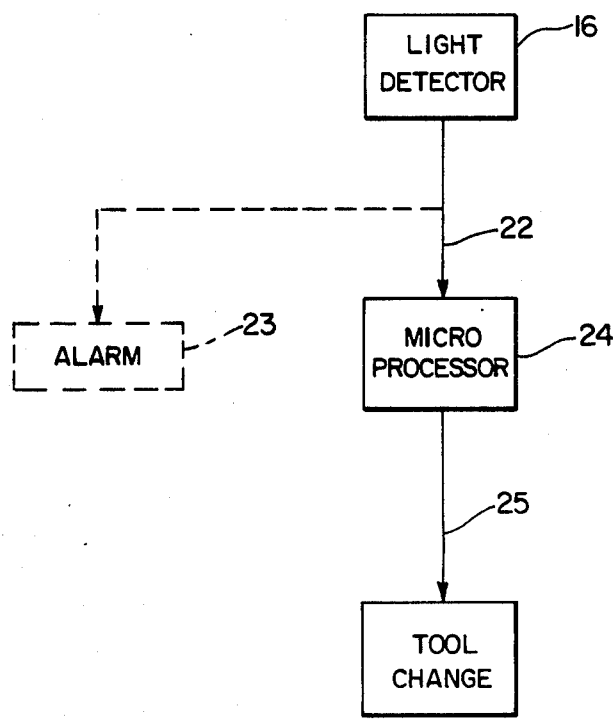

With reference to FIG. 1, there is shown an object, in this case a machine tool 10, namely a high speed drill bit, having an elongate fiber optic 11 imbedded in the tool. Conveniently, as shown, a bore is provided in the tool for this purpose. The fiber optic is then inserted into the bore and may be secured therein by appropriate bonding, such as by adhesive. The fiber optic has a first, light receiving end 12 located at the circumferential surface of the drill bit, preferably remote from the cutting edges of the tool. The second, light emitting end 13 of fiber optic 11 is located within the body of the tool such that light emitting end 13 is covered over by, and underlies, a portion 14 of drill bit 10.

It will be apparent that when light, to which the material making up drill bit 10, is directed from lgiht source 15, onto end 12 of fiber optic 11, it will be transmitted along fiber optic 11 to light emitting end 13. However, overlying portion 14 of dill bit 10 is opaque to the light and hence light at end 13 will not be sensed by light detector 16. However, if the sloped working surface 17 of drill bit 10 is worn away to an extent, indicated by dashed line 18, that end 13 is exposed, light emitted from end 13 will be detected by light detector 16 indicating that the tool is worn.

The distance "d" between the end surface 13 of fiber optic 11 and working surface 17 of drill bit 10 may be any desired distance, such as that which the tool is designed to wear during its useful life.

The arrangement shown in FIG. 1 can also be used to indicate tool breakage. For example, if the tool breaks at a point indicated by dashed line 19, light incident on surface 12 of fiber optic 11 will be conveyed along fiber optic 11 to the end which is exposed when the tool is broken along line 19. The light at this point will be detected by light detector 16, indicating a defective tool.

In the embodiment as thus described, light detected by detector 16 indicates either a broken or worn tool. If desired, the apparatus may be modified to discriminate between these two defects or to indicate different degrees of wear, or both. For example, to indicate breakage, a second fiber optic element 20 may be imbedded in the tool with its light emitting end 21 positioned more remote from working surface 17 whereby, in the event of tool breakage, two discrete light-emitting ends will appear whereas, in the event of wear, only a single such end will appear. Of course, in this embodiment, light detector 16 is capable of determining whether one or two light zones are detected. This is readily accomplished by providing light detector 16 with two discrete light detecting elements, such as photodiodes, each positioned to receive light emitted from a respective one of fiber optics 11 and 20. Similar results may be accomplished with a single fiber optic 11. For example, light emitting end 13 of fiber optic 11 may be colored such that wear is indicated by, for example, red light while a break is indicated by white light. The light detector, in that event, may be provided with means to discriminate between incident red light and incident white light.

The light sensitive element of light detector 16 may be any conventional light detector, preferably one capable of generating an electrical signal when light is incident thereon. A photodiode, or a scanning photodiode array, is suitable.

When light from the fiber optic in the tool or other object is incident upon light detector 16, a signal 22 is generated which indicates wear or breakage as described above.

Light source 15 can be any conventional source of light to which the material of object 10 which overlies light emitting end 13 of fiber optic 11 is opaque and which is capable of transmission along fiber optic 11. For most applications, visiable light, from a conventional incandescent source, is suitable. However, the light need not be visible and may be, e.g., infra red or ultra violet.

Fiber optic 11 may be any conventional fiber optic, such as the type sold under the trademark "Selfoc". A single fiber optic, or a bundle of fiber optics may be used. Where the object is a tool, the fiber optic is preferably imbedded within the tool such that it is remote from any working surface of the tool. This is conveniently done by providing a blind bore in the tool prior to finishing the tool. While a curved bore is shown in the drawing, a straight bore may also be used. The fiber optic is preferably bonded to the bore in the object such as by suitable adhesive.

Signal 22 generated by the light detector provides an indication of a defect in the tool or other object undergoing inspection. This signal may be observed by an operator who may remove the defective item. In this event, the signal is preferably used to trigger an alarm 23 shown in dashed line in the drawing. It is preferred, however, to utilize the invention in an automated system, such as one involving robots, in which case signal 22 is preferably automatically processed to inform a robot that the object under investigation is worn or broken. In the illustrated embodiment, signal 22 is used to effect change of the drill bit automatically under control of a microprocessor 24. Micro processor 24 generates a signal 25 which effects tool change automatically, such as by a robot.

While it is preferred to use a fiber optic member to convey light from the first light receiving end of the object in question, the invention can function in several other ways.

First, an elongate passage capable of transmitting light can be used in place of fiber 12, for example. While not as efficient in conducting light it is less expensive.

Second, such an elongate passage can be filled with solid transparent material, such as glass, essentially performing the same function as a fiber optic inserted into a passage in said object or molded into said object. This approach using solid glass, quartz, etc. provides a stiffer tool than one with a drilled passage containing a fiber for example.

Third, the input or output end of the fiber or passage can be flared or any shape, not just round like the fiber.

The light detector 16 of FIG. 1 can be located to the side of the drill as well and may additionally consist of a photodetector with lens to image the end of the tool on the detector. It may also consist itself of a fiber optic remoted detector, with the fiber pickup located in a drill bushing for example next to said drill.

Figure 2:
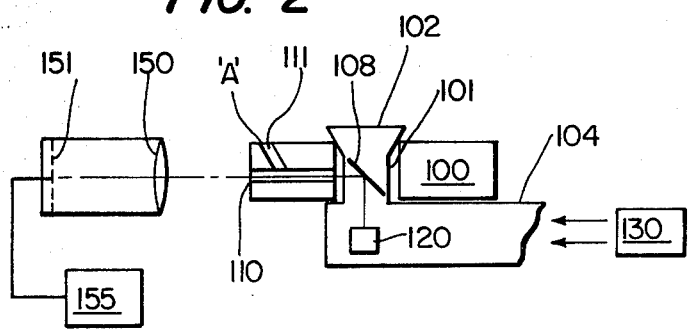
FIG. 2 is a diagrammatic illustration of a second embodiment of the invention useful with carbide or ceramic cutting tool inserts.
Figure 3:
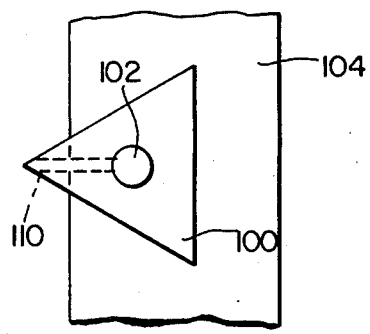
FIG. 3 is a diagrammatic illustration of a portion of FIG. 2.

FIGS. 2 and 3 illustrate a second embodiment of the invention useful with carbide or ceramic cutting tool inserts. Cutter 100 is mounted to tool post 101 on bar 104 by anchor 102. The post has in it a mirror 108 directing light through a passage 110 in the cutter, and through an optional passage 111. Light source, in this case a modulated LED located in the tool itself, provides the illumination. Alternatively, an external source such as 130 can be used, directing light down a passage or fiber optic in the bar 104. In this case the bar can conveniently be rotated (as in boring oprations) while source 130 remains fixed.

The edge whose breakage or wear allow light from 110 or 111 to escape to one or more external detector units, can be other edges on the tool, not just the ones shown. The same principle can also be applied via suitable light source arrangements to all cutter inserts or edges of a tool. Some milling cutters, for example, may have 15 such inserts.

Another version of this invention can be used to detect size or wear in tools by actually dimensionalizing the cutting edge or tool end. For example, of the drawing of FIG. 1, light is normally emitted even on a good tool (rather than only if broken). This light can be used to provide a source whose position in space can be determined by scanning means (e.g. diode array 15 below) to obtain drill length, and breakage (as a change in length or edge condition).

FIG. 2 also illustrates this where edge A of cutter insert 100 is illuminated by light now normally conducted via passage 11. The position and/or contour of edge A is inspected by diode array 151 on whose face the image of the edge is formed by lens 150. Microcomputer 155 compares data obtained to that which is correct.

What is claimed is:

1. A method of detecting wear or breakage of an object which comprises:
providing an object having an elongate fiber optic imbedded in the object such that a first, light receiving end of said fiber optic is located at a first surface of the object and such that a second, light emitting end of said fiber optic is located within the body of said object and spaced from a further surface of the object such that the light emitting end of said fiber optic is covered by a portion of said object overlying said light emitting end of said fiber optic;

directing light onto said light receiving end of said fiber optic whereby said light is transmitted along said fiber optic to the light emitting end thereof, said light being such that the portion of the object overlying said light emitting end of said fiber optic is opaque thereto; and, detecting any light emitted from said light emitting end of said fiber optic whereby the detection of emitted light provides an indication that the portion of said object overlying said light emitting end of said fiber optic is not present.

2. A method according to claim 1 wherein said object comprises a tool and wherein said further surface of said tool comprises a working surface thereof.

3. A method according to claim 2 wherein the light emitting end of said fiber optic is spaced below said working surface a distance to which the tool is designed to wear during its useful working life.

4. A method according to claim 4 wherein light is directed onto said light receiving end of said fiber optic by positioning said tool in a tool inspection position in a tool inspection zone, said tool inspection zone comprising a light source for directing light onto a light receiving end of a fiber optic of a tool in said tool inspection position, and a light detector for detecting light emitted from a light emitting end of a fiber optic of a tool inspection position.

5. Apparatus for detecting wear or breakage of an object comprising:

an object having an elongate fiber optic imbedded in the object such that a first, light receiving end of said fiber optic is located at a first surface of the object and such that a second, light emitting end of said fiber optic is located within the body of said object and spaced from a further surface of the object such that the light emitting end of said fiber optic is covered by a portion of said object overlying said light emitting end of said fiber optic;

means for directing light onto said light receiving end of said fiber optic whereby said light is transmitted along said fiber optic to the light emitting end thereof, said light being such that the portion of the object overlying said light emitting end of said fiber optic is opaque thereto; and, means for detecting any light emitted from said light emitting end of said fiber optic whereby the detection of emitted light provides an indication that the portion of said object overlying said light emitting end of said fiber optic is not present.

6. Apparatus according to claim 5 wherein said object comprises a tool and wherein said further surface of said tool comprises a working surface thereof.

7. Apparatus according to claim 6 wherein the light emitting end of said fiber optic is spaced below said working surface a distance to which the tool is designed to wear during its useful working life.

8. Apparatus according to claim 6 further including means for positioning said tool in a tool inspection position in a tool inspection zone, said light directing means being located for directing light onto a light receiving end of a fiber optic of a tool in said tool inspection position, and said light detecting means being located in said tool inspection zone for detecting light emitted from a light emitting end of a fiber optic of a tool in said tool inspection position.

9. In an object having an internal wear or breakage indicator, the improvement wherein said wear or breakage indicator comprises an elongate fiber optic imbedded in the object such that a first, light receiving end of said fiber optic is located at a first surface of the object and such that a second, light emitting end of said fiber optic is located within the body of said object and spaced from a further surface of the object such that the light emitting end of said fiber optic is covered by a portion of said object overlying said light emitting end of said fiber optic.

10. An improved object according to claim 9 wherein said object comprises a tool and wherein said second surface comprises a working surface of said tool.

11. An improved object according to claim 10 wherein the light emitting end of said fiber optic is spaced below said working surface a distance to which the tool is designed to wear during its useful working life.

12. A method of detecting wear or breakage of an object which comprises:

providing an object having an elongate light transmitting passageway such that a first, light receiving end of said passageway is located at a first surface of the object and such that a second, light emitting end of said passageway is located within the body of said object and spaced from a further surface of the object such that the light emitting end of said passageway is covered by a portion of said object overlying said light emitting end of said passageway;

directing light onto said light receiving end of said passageway whereby said light is transmitted along said passageway to the light emitting end thereof, said light being such that the portion of the object overlying said light emitting end of said passageway is opaque thereto; and detecting any light emitted from said light emitting end of said passageway whereby the detection of emitted light provides an indication that the portion of said object overlying said light emitting end of said passageway is not present.

13. A method according to claim 12 wherein said passageway is hollow.

14. A method according to claim 12 wherein said passageway comprises a rigid rod of light-transmitting material.

* * * * *